US 8,530,065 B1

(12) United States Patent
Chernyshov et al.

(10) Patent No.: US 8,530,065 B1
(45) Date of Patent: Sep. 10, 2013

(54) COMPOSITE MAGNETIC RECORDING MEDIUM

(75) Inventors: Alexander Chernyshov, San Jose, CA (US); Hua Yuan, Milpitas, CA (US); B. Ramamurthy Acharya, Fremont, CA (US)

(73) Assignee: WD Media, LLC, Irvine, CA (US)

( * ) Notice: Subject to any disclaimer, the term of this patent is extended or adjusted under 35 U.S.C. 154(b) by 375 days.

(21) Appl. No.: 12/854,115

(22) Filed: Aug. 10, 2010

(51) Int. Cl.
*G11B 5/667* (2006.01)

(52) U.S. Cl.
USPC ........................................ 428/829; 428/836.3

(58) Field of Classification Search
None
See application file for complete search history.

(56) References Cited

U.S. PATENT DOCUMENTS

| | | | |
|---|---|---|---|
| 5,603,766 A | 2/1997 | Visokay et al. | |
| 5,824,409 A | 10/1998 | Sellmyer et al. | |
| 6,007,623 A | 12/1999 | Thiele et al. | |
| 6,086,974 A | 7/2000 | Thiele et al. | |
| 6,139,907 A | 10/2000 | Sellmyer et al. | |
| 6,183,606 B1 | 2/2001 | Kuo et al. | |
| 6,599,646 B2 | 7/2003 | Suzuki et al. | |
| 6,716,516 B2 | 4/2004 | Futamoto et al. | |
| 6,824,817 B2 | 11/2004 | Araki et al. | |
| 6,846,583 B2 | 1/2005 | Inaba et al. | |
| 7,241,520 B2 | 7/2007 | Shin et al. | |
| 7,282,278 B1 | 10/2007 | Nolan | |
| 7,286,324 B2 | 10/2007 | Yasui et al. | |
| 7,901,801 B2 * | 3/2011 | Oikawa et al. | 428/827 |
| 2002/0041980 A1 | 4/2002 | Suzuki et al. | |
| 2004/0110035 A1 | 6/2004 | Shin et al. | |
| 2004/0185307 A1 | 9/2004 | Oikawa et al. | |
| 2004/0191578 A1 | 9/2004 | Chen et al. | |
| 2006/0188743 A1 | 8/2006 | Seki et al. | |
| 2006/0204791 A1 * | 9/2006 | Sakawaki et al. | 428/828.1 |
| 2007/0026262 A1 | 2/2007 | Maeda | |
| 2007/0072011 A1 | 3/2007 | Li et al. | |
| 2008/0311430 A1 | 12/2008 | Chen et al. | |
| 2010/0209737 A1 * | 8/2010 | Bian et al. | 428/827 |
| 2012/0171519 A1 * | 7/2012 | Qiu et al. | 428/827 |

FOREIGN PATENT DOCUMENTS

WO 2008030199 A1 3/2008

OTHER PUBLICATIONS

Hu, Jiang Feng et al., "Exchange Coupling Assisted FePtC Perpendicular Recording Media", Applied Physics Letters 93, 072504 pp. 1-3, Aug. 2008.
Zhou, Tie-Jun et al., "Anisotropy Graded FePt-TiO2 Nanocomposite Thin Films With Small Grain Size", Applied Physics Letters 94, 152505 pp. 1-3, Apr. 2009.
Jung, H.S. et al., "Comparison of Media Properties Between Hard/Soft Stacked Composite and Capping Layer Perpendicular Recording Media", Journal of Magnetism and Magnetic Materials 320, pp. 3151-3156, Aug. 2008.
Inaba, Y. et al., "Preliminary Study on (CoPtCr/NiFe)—SiO2 Hard/Soft-Stacked Perpendicular Recording Media", IEEE Transactions on Magnetics, V.41, No. 10, pp. 3136-3138, Oct. 2005.
Jung, H.S. et al., "Effect of Magnetic Softness in a Soft Layer on Media Properties of Hard/Soft Stacked Composite Perpendicular Media", Journal of Applied Physics 105, 07B740 pp. 1-3, Apr. 2009.

* cited by examiner

*Primary Examiner* — Kevin Bernatz (57) ABSTRACT

A composite hard magnetic recording layer for a magnetic storage comprises a hard magnetic layer and a capping layer. The composite recording layer has a crystal structure where crystal grains include a portion within the magnetic layer and a portion within the capping layer.

49 Claims, 8 Drawing Sheets

COMPOSITE MAGNETIC RECORDING MEDIUM

TECHNICAL FIELD

This invention relates to the field of disk drives and more specifically, to perpendicular magnetic recording media for disk drives.

BACKGROUND

Figure 1:
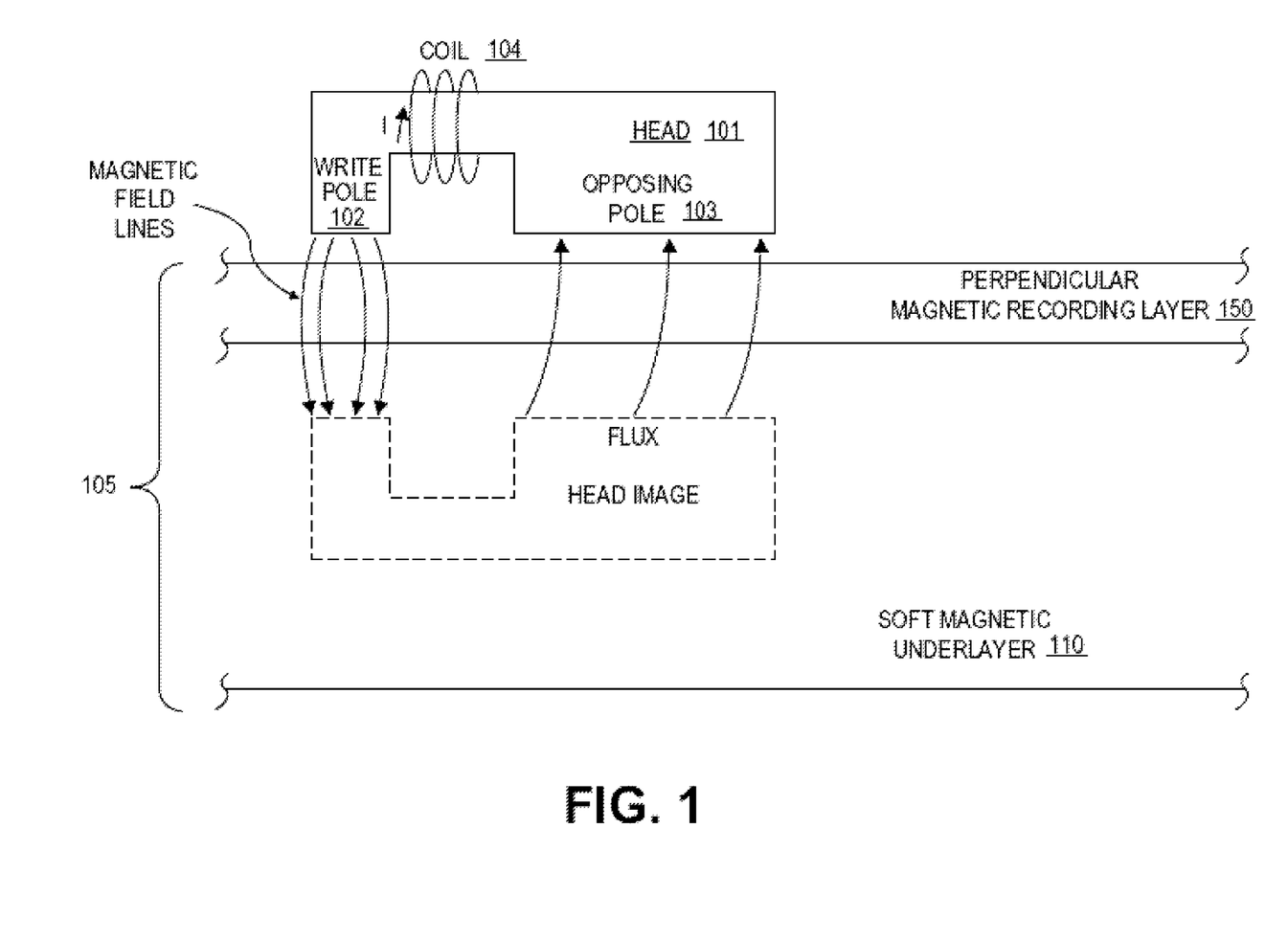
FIG. 1 illustrates a conventional perpendicular recording disk drive system.

For all types of substrates, magnetic recording media has begun to incorporate perpendicular magnetic recording (PMR) technology in an effort to increase areal density and is now working toward densities of 800 Gbits/in$^2$. Generally, PMR media may be partitioned into two primary functional regions: a soft magnetic underlayer (SUL) and a magnetic recording layer (RL). FIG. 1 (prior art) illustrates portions of a conventional perpendicular magnetic recording disk drive system having a recording head 101 including a trailing write pole 102 and a leading return (opposing) pole 103 magnetically coupled to the write pole 102. An electrically conductive magnetizing coil 104 surrounds the yoke of the write pole 102. The bottom of the opposing pole 103 has a surface area greatly exceeding the surface area of the tip of the write pole 102. As the magnetic recording disk 105 is rotated past the recording head 101, current is passed through the coil 104 to create magnetic flux within the write pole 102. The magnetic flux passes from the write pole 102, through the disk 105, and across to the opposing pole 103 to record in the PMR layer 150. The SUL 110 enables the magnetic flux from the trailing write pole 102 to return to the leading opposing pole 103 with low impedance.

BRIEF DESCRIPTION OF THE DRAWINGS

The present invention is illustrated by way of example, and not limitation, in the figures of the accompanying drawings in which.

DETAILED DESCRIPTION

In the following description, numerous specific details are set forth, such as examples of specific layer compositions and properties, to provide a thorough understanding of various embodiment of the present invention. It will be apparent however, to one skilled in the art that these specific details need not be employed to practice various embodiments of the present invention. In other instances, well known components or methods have not been described in detail to avoid unnecessarily obscuring various embodiments of the present invention.

The terms "over," "under," "between," and "on" as used herein refer to a relative position of one media layer with respect to other layers. As such, for example, one layer disposed over or under another layer may be directly in contact with the other layer or may have one or more intervening layers. Moreover, one layer disposed between two layers may be directly in contact with the two layers or may have one or more intervening layers. In contrast, a first layer "on" a second layer is in contact with that second layer. Additionally, the relative position of one layer with respect to other layers is provided assuming operations are performed relative to a substrate without consideration of the absolute orientation of the substrate.

Embodiments of the present invention include a composite hard magnetic recording layer disposed over the soft magnetic underlayer (SUL) and interlayers or heat sink layers. The composite hard magnetic recording layer comprises a hard magnetic layer and a capping magnetic layer over the hard magnetic layer. The granular structure of the composite hard magnetic recording layer comprises a plurality of columnar grains that extend between the hard magnetic layer and the capping magnetic layer. As described below, the capping layer enables a thicker recording layer. In particular embodiments, the capping magnetic has a lower coercivity than the hard magnetic layer, reducing the coercivity of the composite recording layer as a whole.

Figure 2A:
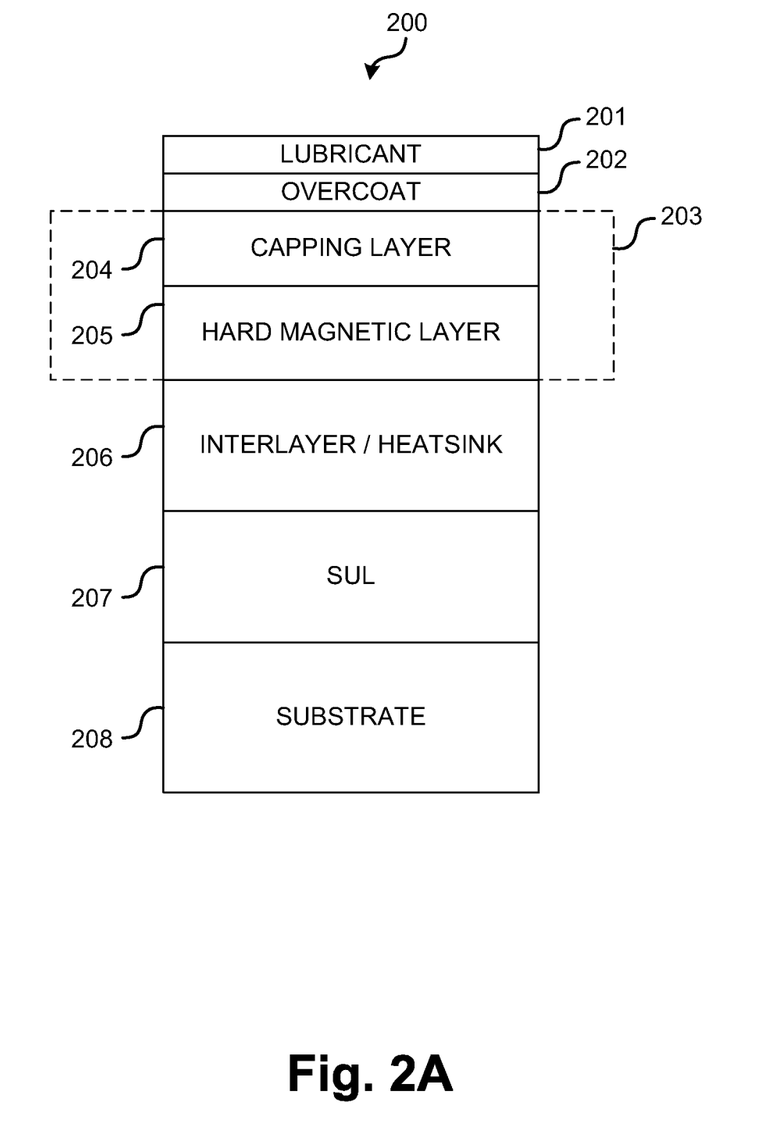
FIG. 2A illustrates a cross-sectional view of a recording media structure having a composite hard magnetic recording layer.

FIG. 2A is a cross-section of a PMR media structure 200. It should be appreciated that the layers discussed herein may be formed on both sides of substrate to form a double-sided magnetic recording disk. However, only the layers on a single side of substrate are shown for ease of illustration. Alternatively, a single sided perpendicular magnetic recording disk may also be formed.

The PMR media structure 200 includes a substrate 208. Substrate 208 may be, for example, a glass, a metal, and/or a metal alloy material. In a particular embodiment, the substrate 208 is disk-shaped or annular. Glass substrates that may be used include, for example, a silica-containing glass such as borosilicate glass and aluminosilicate glass. Metal and metal alloy substrates that may be used include, for example, aluminum (Al), tantalum (Ta), and aluminum magnesium (AlMg) substrates. In an alternative embodiment, other substrate materials such as polymers and ceramics may be used.

Disposed over the substrate 208 is a SUL 207. Generally, the SUL 207 may include any materials known in the art. The SUL 207 itself may be a laminate or multilayer stack of a plurality of soft magnetic layers separated by nonmagnetic or antiferromagnetic films. In some embodiments, the SUL 207 includes a synthetic antiferromagnet (SAF) structure comprising two amorphous soft ferromagnetic layers (e.g., CoTaZr or CoFeTaZr, etc.) antiferromagnetically coupled with one another across a spacer layer or layers. In heat assisted magnetic recording (HAMR) applications, the spacer layer or layers can include a heat sink layer or layers. The thickness of the SUL 207 will generally be in the range of 5 nm to 60 nm. In some embodiments, the thickness of the SUL 207 is between about 20 nm to about 45 nm. In particular, the SUL 207 thickness may be between 19 nm and 44 nm.

The plurality of intermediate layers may further include interlayers or heat sink layers 206 disposed between the SUL 207 and the composite recording layer 203. In HAMR applications, the layers 206 may include layers of thermally conductive materials such as AgPd, or CuZr. Interlayers 206 may also include materials to regulate the magnetic exchange coupling between the composite recording layer 203 and the SUL 207 and to provide nucleation for the composite recording layer 203 so that L10 ordering occurs. Such materials may include CrX alloys where X is any of Mo, Ta, W, Ru, or B, such as $CrRu_{10}B_3$, oxides such as MgO, and nitrides such as TiN.

Disposed over the interlayers or heatsink layers is the composite recording layer 203. The composite recording layer 203 comprises a capping layer 204 disposed over a hard magnetic layer 205. Disposed over the composite recording layer 203 are overcoat layer 202 and lubricant layer 201.

Figure 2B:
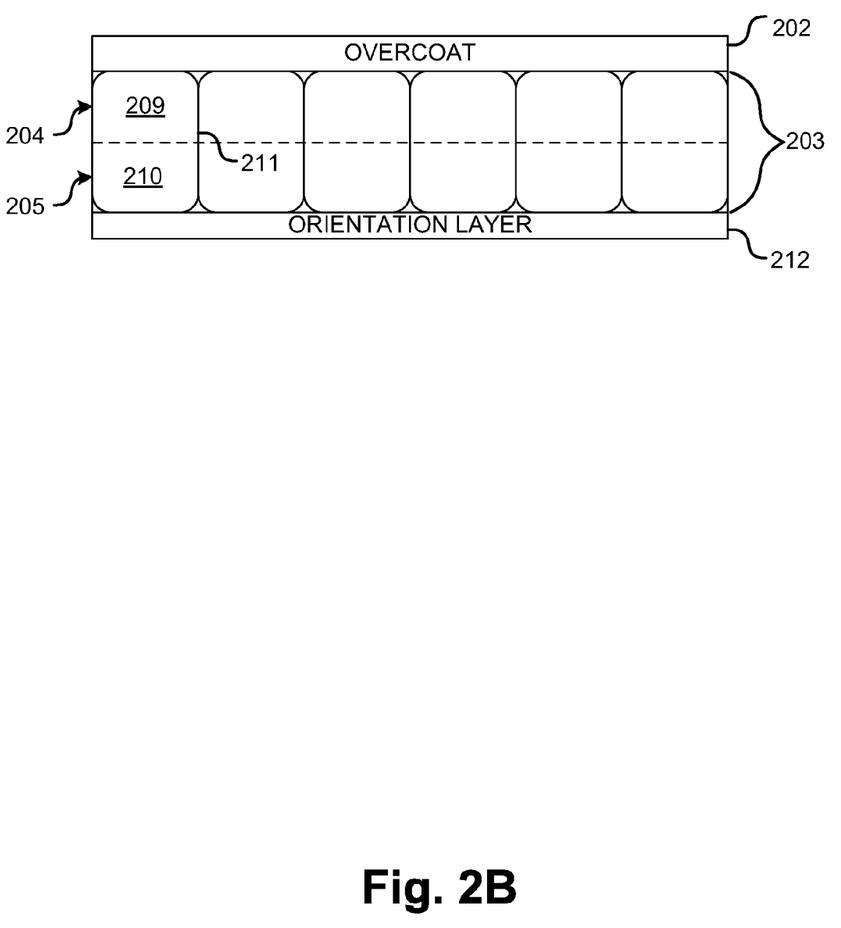
FIG. 2B illustrates a cross-sectional view of a composite hard magnetic recording layer.

Crystal grains of the composite recording layer 203 include a portion within the capping layer and a portion within the hard magnetic layer. FIG. 2B illustrates such a composite recording layer 203. The alloy of the composite recording layer comprises columnar crystal grains 211. The crystal grains comprise a portion 209 having a metal phase from the capping layer 204, and a portion 210 having a metal phase from the hard magnetic layer 205. The grains are disposed on an orientation layer 212 comprising a material configured to initialize and orient the formation of the desired crystal structure and texture in the composite layer 203. In some embodiments, the composite magnetic layer 203 has an $L1_0$ crystal structure and a (001) crystal texture.

In some embodiments, the composite recording layer 203 is formed by forming a crystal layer comprising the hard magnetic layer, then growing the capping layer portions of the crystals on the hard magnetic layer. For example, this may be performed using a sputtering epitaxial growth process. In some embodiments, the formation of the composite crystal grains 211 allows recording layer thicknesses beyond about 5 nm. This may provide an increased signal-to-noise ratio in storage devices using this media. Additionally, in further embodiments, the coercivity of the composite recording layer 203 may be reduced to below that of the hard magnetic layer 205 alone. Such reduction may allow the use of FePt in unassisted PMR or may allow for lower temperatures to be used in HAMR devices.

In various embodiments, the capping layer may comprise a soft magnetic material or a hard magnetic material. In both cases, the capping layer may have a coercivity less than or equal to the coercivity of the hard magnetic layer, thereby resulting a composite layer having a reduced coercivity. The capping layer may comprise a CoPt—$SiO_2$ alloy, a CoPt—$TiO_2$ alloy, a FePt—$SiO_2$ alloy, or a FePt—$TiO_2$ alloy. The various proportions of the oxides and the alloys can be used to configure whether the capping layer is a hard magnetic material or a soft magnetic material. In some embodiments, the capping layer composition obeys the formula: $(A_1(X)A_2(1-X))(1-Y)$—$O(Y)$, where $A_1$ is Co or Fe, $A_2$ is Pt, 0 is $SiO_2$ or $TiO_2$, X is between 40 at. % and 80 at. %, and Y is between 5 at. % and 15 at. %. In particular embodiments, X is between 40 at. % and 60 at. % and may form a hard magnetic layer. In other embodiments, X is between 60 at. % and 80 at. % and may form a soft magnetic layer.

The capping layer 204 may be a variety of different thicknesses, for example between about 1 nm and about 10 nm. In some embodiments, this allows for a total thickness of the composite recording layer 203 to be about 15 nm. As a result of the capping layer, a hard magnetic material having a coercivity greater than about 12 kOe can be used to form a composite recording medium having a coercivity below about 10 kOe.

Figure 3:
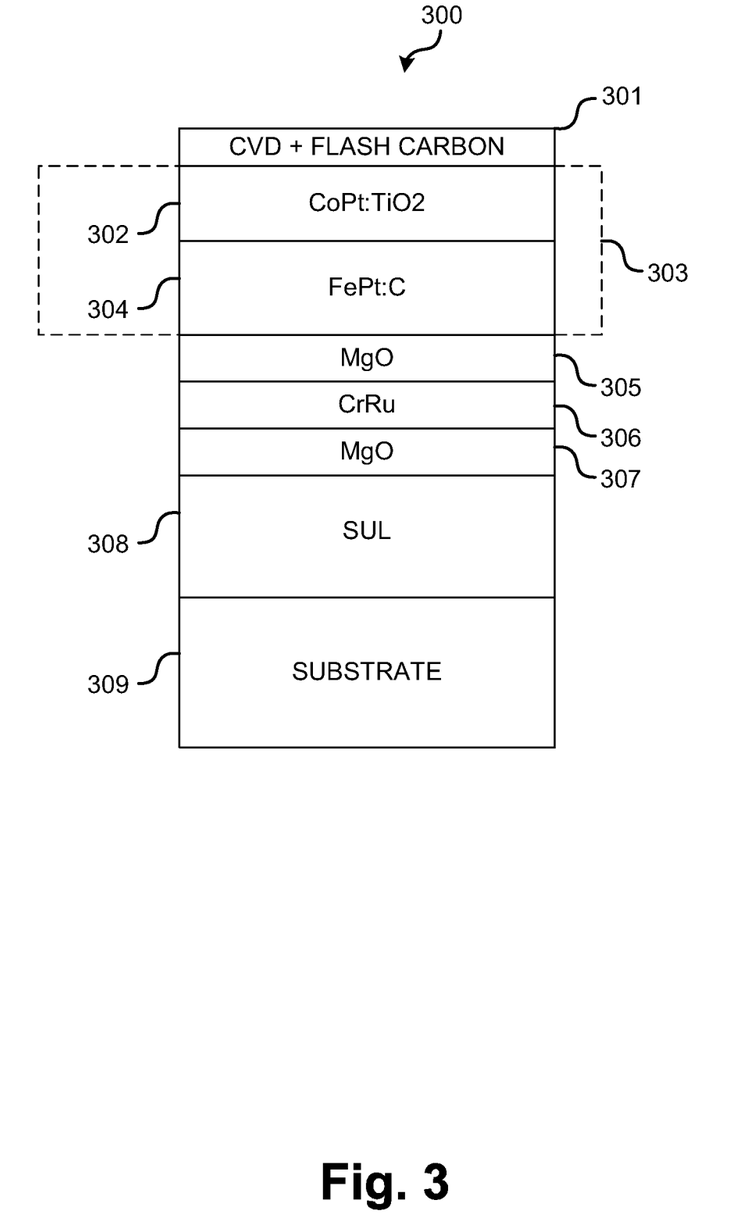
FIG. 3 illustrates a cross-sectional view of an example recording media structure having a composite hard magnetic recording layer comprises an FePt—C hard layer and a CoPt—TiO2 capping layer.

FIG. 3 illustrates a cross-sectional view of an example recording media structure having a composite hard magnetic recording layer comprises an FePt—C hard layer and a CoPt—TiO2 capping layer. This recording media may be employed in PMR storage devices. As described above, a SUL 308 is disposed over a substrate 309. Disposed on the SUL is a crystal orientation layer 307 comprising MgO. This layer assists the formation of a (002) crystal texture in the CrRu interlayer 306. The CrRu interlayer 306 controls the spacing between the recording layer 303 and the SUL 308. Disposed on this layer is another orientation layer 305 comprising MgO. MgO layer 305 assists the formation of an $L1_0$ crystal structure having a (001) texture in the composite recording layer 303. In this embodiment, the hard magnetic layer 304 comprises an FePt—C material. Disposed on this layer is a capping layer 302 comprising a CoPt—$TiO_2$ material.

In experiments, the addition of a 6 nm CoPt—$TiO_2$ soft magnetic layer effectively reduced the coercivity $H_c$ from 12.5 kOe to 6 kOe. The addition of the capping layer 302 did not affect the (001) $L1_0$ texture of the FePt layer 304.

Figure 4:
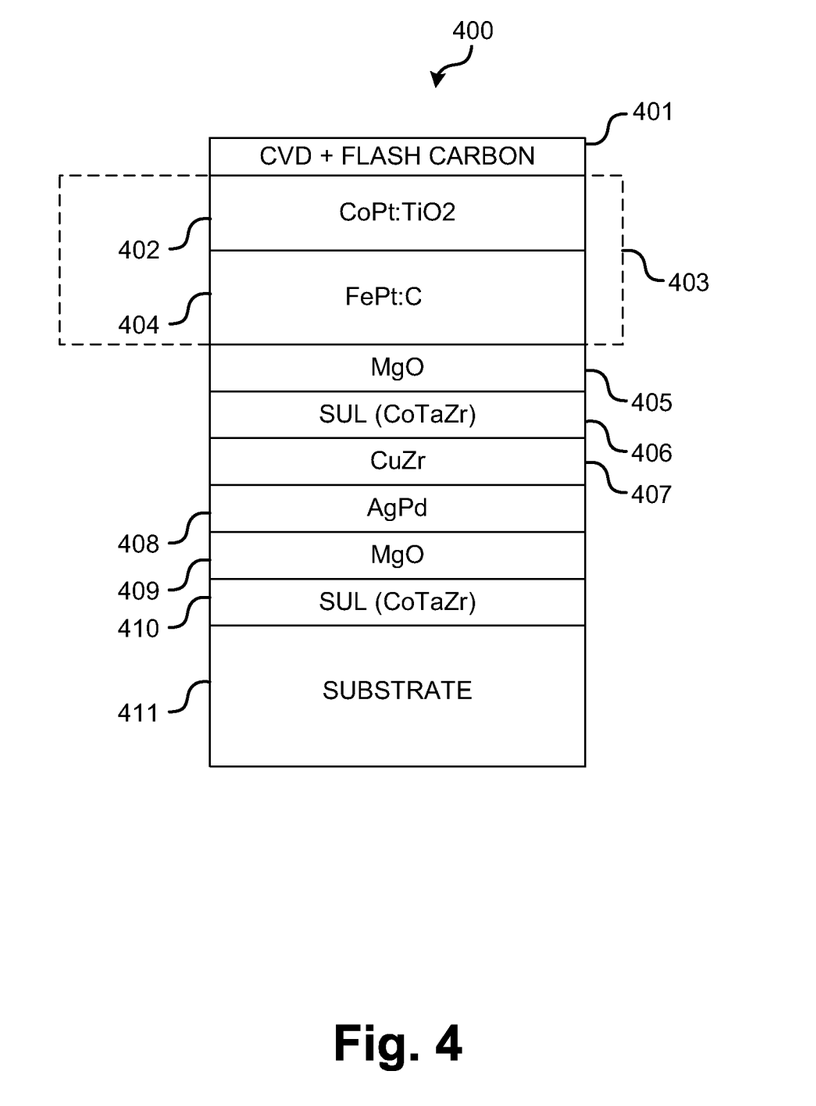
FIG. 4 illustrates a cross-sectional view of a second example recording media structure having a composite hard magnetic recording layer comprises an FePt—C hard layer and a CoPt—TiO2 capping layer.

FIG. 4 illustrates a cross-sectional view of a second example recording media structure having a composite hard magnetic recording layer comprises an FePt—C hard layer and a CoPt—TiO2 capping layer. This recording media 400 includes a heatsink and may be employed in HAMR storage devices. Disposed on substrate 411 is a first SUL layer 410 comprising CoTaZr. An orientation layer 409 comprising MgO provides orientation for the crystal texture of heatsink interlayers 408 and 407, comprising AgPd and CuZr, respectively. A SUL 406 comprising a second layer of CoTaZr is disposed on the heatsink layer 407. The composite recording layer 403 is disposed over this layer, with an interposing orientation layer 405 comprising MgO, as described above.

In experiments, the use of about 9 nm of soft magnetic CoPt—$TiO_2$ for capping layer 402 results in an drop in $H_c$ from about 14 kOe down to 5 kOe. The addition of the capping layer 402 did not affect the (001) $L1_0$ texture of the FePt layer 404.

Figure 5A:
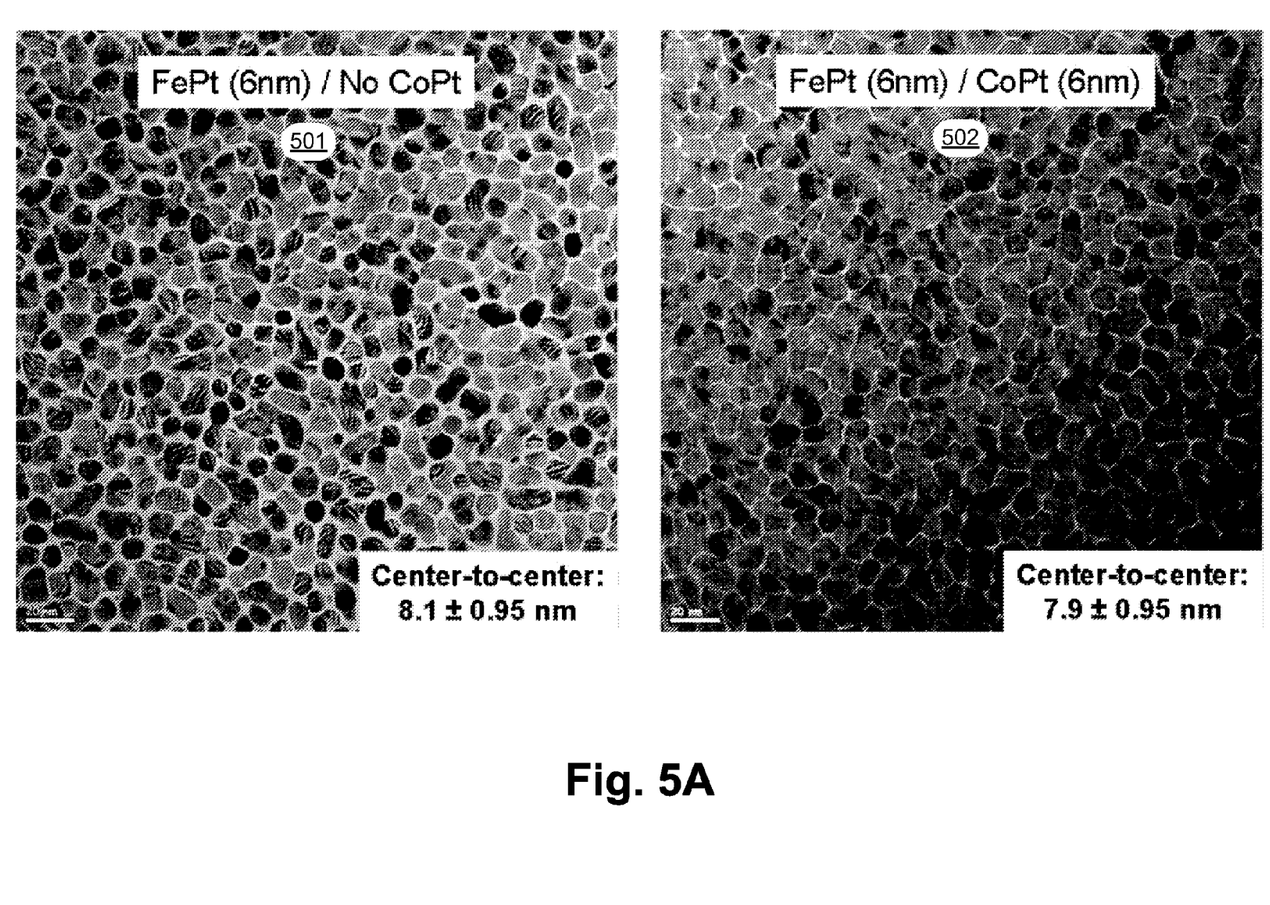
FIG. 5A is a plane view transmission electron micrograph (TEM) image showing grain structure of an example composite hard magnetic recording layer.

FIG. 5A is a plane view transmission electron micrograph (TEM) image showing grain structure of an example composite hard magnetic recording layer. In the experiment that produced this material, a 6 nm soft magnetic CoPt—$TiO_2$ layer was grown on a 6 nm hard magnetic FePt—C layer. TEM 502 shows this result, while TEM 501 illustrates a 6 nm hard magnetic FePt—C layer without a capping layer. As these results indicated, the FePt—C layer provides a template with well isolated grains. The soft layer developed a similar grain structure that followed the FePt—C template.

Figure 5B:
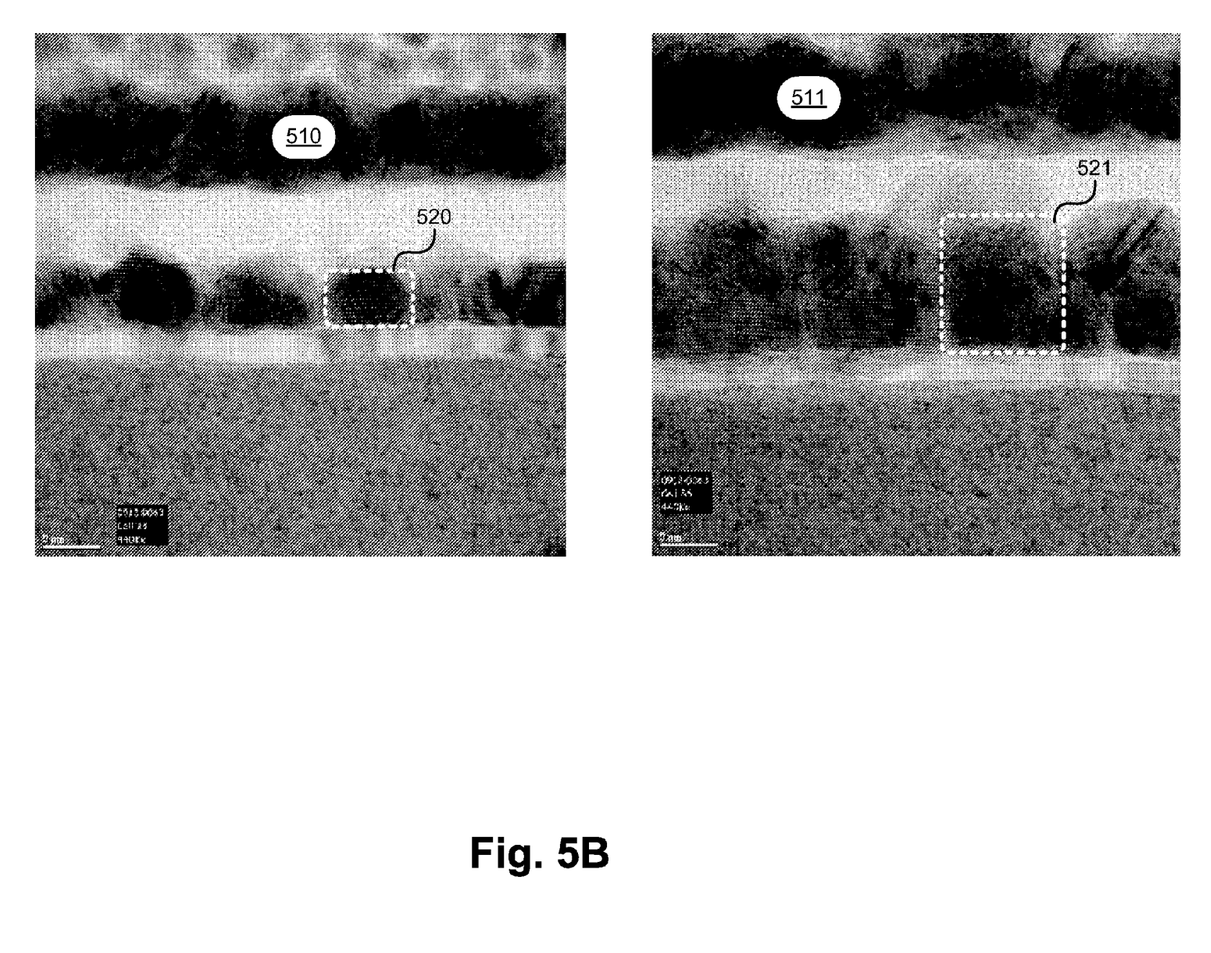
FIG. 5B is a cross-sectional TEM image showing grain structure of an example composite hard magnetic recording layer.

FIG. 5B is a cross-sectional TEM image showing grain structure of the example composite hard magnetic recording layer of FIG. 5A. TEM 510 illustrates the media with the 6 nm hard magnetic FePt—C layer without a capping layer and TEM 511 illustrates the composite recording layer. A crystal of the hard magnetic layer is highlighted in area 520, and a crystal of the composite layer is highlighted in area 521. These results show the granular structure of the composite recording layer and illustrate that the grain aspect ratio is changed from about 1:1 in FePt—C only to about 2:1 in the composite media, resulting in an approximate doubling of the magnetic layer thickness with a retention of crystal structure.

Figure 6:
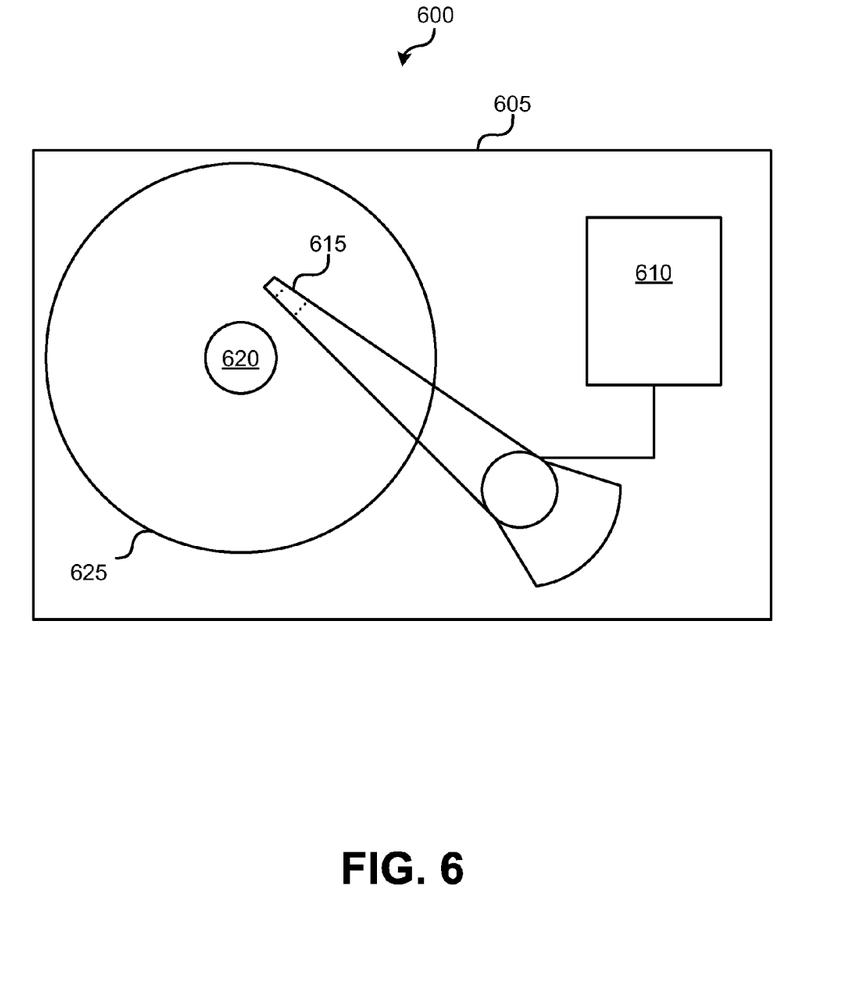
FIG. 6 illustrates a disk drive including a perpendicular magnetic recording disk with a recording media having a composite hard magnetic layer.

FIG. 6 illustrates a disk drive 600 having disk 625. Disk drive 600 may include one or more disks 625 to store data. Disk 625 resides on a spindle assembly 620 that is mounted to drive housing 605. Data may be stored along tracks in the magnetic recording layer of disk 625. The reading and writing of data is accomplished with head 615 that has both read and write elements. The write element is used to alter the properties of the perpendicular magnetic recording layer of disk 625. In one embodiment, head 615 may have magneto-resistive (MR), or giant magneto-resistive (GMR) elements. In an alternative embodiment, head 615 may be another type of head, for example, an inductive read/write head or a Hall effect head. In some embodiments, the disk 625 has the media structure as depicted in FIG. 5, and the disk drive 600 is a heat assisted magnetic recording (HAMR) drive and incorporate components of a laser source, a waveguide, and a near-field transducer (not depicted). Techniques in generating and focusing a laser beam are known in the art, and thus, are not described in particular detail. A spindle motor (not shown) rotates spindle assembly 620 and, thereby, disk 625 to position head 615 at a particular location along a desired disk track. The position of head 615 relative to disk 625 may be controlled by position control circuitry 610. The use of disk 625 fabricated in the manners discussed above may improve the performance of the perpendicular magnetic recording layer of disk 625 by providing a higher magnetic anisotropy from an $L1_0$-ordered recording layer. The use of disk 625 fabricated in the manners discussed above may also enable the use of $L1_0$-structured media on non-glass substrates.

In the foregoing specification, embodiments of the invention have been described with reference to specific exemplary features thereof. It will, however, be evident that various modifications and changes may be made thereto without departing from the broader spirit and scope of the invention as set forth in the appended claims. The specification and figures are, accordingly, to be regarded in an illustrative rather than a restrictive sense.

What is claimed is:

1. A recording medium, comprising:
a composite hard magnetic recording layer consisting of a plurality of columnar grains having a crystallographic texture; and
the composite hard magnetic recording layer comprising a hard magnetic layer and a capping magnetic layer disposed over the hard magnetic layer;
wherein a given columnar grain of the plurality of columnar grains includes a first portion within the hard magnetic layer and a second portion within the capping magnetic layer
wherein the composite hard magnetic recording layer has an $L1_0$ crystal structure and the crystallographic texture comprises a (001) texture; and
wherein the hard magnetic layer comprises a FePt—C alloy.

2. The recording medium of claim 1, wherein the capping magnetic layer has a first coercivity that is less than or equal to a second coercivity of the hard magnetic layer.

3. The recording medium of claim 1, wherein the capping magnetic layer comprises a soft magnetic material.

4. The recording medium of claim 1, wherein the capping magnetic layer comprises a hard magnetic material.

5. The recording medium of claim 1, wherein the capping magnetic layer comprises a CoPt—$SiO_2$ alloy, a CoPt—$TiO_2$ alloy, a FePt—$SiO_2$ alloy, or a FePt—$TiO_2$ alloy.

6. The recording medium of claim 5, wherein:
if present, the composition of the CoPt—$SiO_2$ alloy is $(CoXPt(1-X))(1-Y)$—$(SiO_2)(Y)$;
if present, the composition of the CoPt—$TiO_2$ alloy is $(CoXPt(1-X))(1-Y)$—$(TiO_2)(Y)$;
if present, the composition of the FePt—$SiO_2$ alloy is $(FeXPt(1-X))(1-Y)$—$(SiO_2)(Y)$; and
if present, the composition of the FePt—$TiO_2$ alloy is $(FeXPt(1-X))(1-Y)$—$(TiO_2)(Y)$;
where X is between 40 at. % and 80 at. % and Y is between 5 at. % and 15 at. %.

7. The recording medium of claim 6, where X is between 40 at. % and 60 at. %.

8. The recording medium of claim 6, where X is between 60 at. % and 80 at. %.

9. The recording medium of claim 1, wherein the capping magnetic layer has a thickness between about 1 nm and 10 nm.

10. The recording medium of claim 1, wherein the composite hard magnetic recording layer has a thickness less than about 15 nm.

11. The recording medium of claim 1, wherein the composite hard magnetic recording layer has a coercivity below about 10 kOe.

12. The recording medium of claim 1, wherein the hard magnetic layer has a coercivity greater than about 12 kOe.

13. The recording medium of claim 1, wherein the capping magnetic layer has a coercivity from about 1 kOe to about a coercivity of the hard magnetic layer.

14. The recording medium of claim 1, further comprising an orientation layer configured to orient a formation of the $L1_0$ crystal structure and the (001) texture, wherein the orientation layer comprises MgO, and wherein the composite hard magnetic recording layer is over the orientation layer.

15. The recording medium of claim 14, wherein the capping magnetic layer comprises a CoPt—$SiO_2$ alloy, a CoPt—$TiO_2$ alloy, a FePt—$SiO_2$ alloy, or a FePt—$TiO_2$ alloy.

16. The recording medium of claim 15, wherein the capping magnetic layer has a first coercivity that is less than or equal to a second coercivity of the hard magnetic layer.

17. The recording medium of claim 1:
wherein a width of the given columnar grain is substantially the same throughout a height thereof; and
wherein the height of the given columnar grain extends from a bottom of the hard magnetic layer to a top of the capping magnetic layer.

18. A recording device comprising:
a housing containing a recording head and a recording medium;
the recording head for reading magnetic signals from, and writing magnetic signals to, the recording medium; and
the recording medium comprising:
a composite hard magnetic recording layer consisting of a plurality of columnar grains having a crystallographic texture; and
the composite hard magnetic recording layer comprising a hard magnetic layer and a capping magnetic layer disposed over the hard magnetic layer;
wherein a given columnar grain of the plurality of columnar grains includes a first portion within the hard magnetic layer and a second portion within the capping magnetic layer,
wherein the composite hard magnetic recording layer has an $L1_0$ crystal structure and the crystallographic texture comprises a (001) texture; and
wherein the hard magnetic layer comprises a FePt—C alloy.

19. The recording device of claim 18, wherein the capping magnetic layer has a first coercivity that is less than or equal to a second coercivity of the hard magnetic layer.

20. The recording device of claim 18, wherein the capping magnetic layer comprises a soft magnetic material.

21. The recording device of claim 18, wherein the capping magnetic layer comprises a hard magnetic material.

22. The recording device of claim 18, wherein the capping magnetic layer comprises a CoPt—$SiO_2$ alloy, a CoPt—$TiO_2$ alloy, a FePt—$SiO_2$ alloy, or a FePt—$TiO_2$ alloy.

23. The recording device of claim 22, wherein:
if present, the composition of the CoPt—$SiO_2$ alloy is $(Co_XPt_{(1-X)})_{(1-Y)}$—$(SiO_2)_{(Y)}$;
if present, the composition of the CoPt—$TiO_2$ alloy is $(Co_XPt_{(1-X)})_{(1-Y)}$—$(TiO_2)_{(Y)}$;
if present, the composition of the FePt—$SiO_2$ alloy is $(Fe_XPt_{(1-X)})_{(1-Y)}$—$(SiO_2)_{(Y)}$; and
if present, the composition of the FePt—$TiO_2$ alloy is $(Fe_XPt_{(1-X)})_{(1-Y)}$—$(TiO_2)_{(Y)}$;
where X is between 40 at. % and 80 at. % and Y is between 5 at. % and 15 at. %.

24. The recording device of claim 23, where X is between 40 at. % and 60 at. %.

25. The recording device of claim 23, where X is between 60 at. % and 80 at. %.

26. The recording device of claim 18, wherein the capping magnetic layer has a thickness between about 1 nm and 10 nm.

27. The recording device of claim 18, wherein the composite hard magnetic recording layer has a thickness less than about 15 nm.

28. The recording device of claim 18, wherein the composite hard magnetic recording layer has a coercivity below about 10 kOe.

29. The recording device of claim 18, wherein the hard magnetic layer has a coercivity greater than about 12 kOe.

30. The recording device of claim 18, wherein the capping magnetic layer has a coercivity from about 1 kOe to about a coercivity of the hard magnetic layer.

31. The recording device of claim 18, wherein the recording medium further comprises an orientation layer configured to orient a formation of the $L1_0$ crystal structure and the (001) texture, wherein the orientation layer comprises MgO, and wherein the composite hard magnetic recording layer is over the orientation layer.

32. The recording device of claim 31, wherein the capping magnetic layer comprises a CoPt—$SiO_2$ alloy, a CoPt—$TiO_2$ alloy, a FePt—$SiO_2$ alloy, or a FePt—$TiO_2$ alloy.

33. The recording device of claim 32, wherein the capping magnetic layer has a first coercivity that is less than or equal to a second coercivity of the hard magnetic layer.

34. The recording device of claim 18:
wherein a width of the given columnar grain is substantially the same throughout a height thereof; and
wherein the height of the given columnar grain extends from a bottom of the hard magnetic layer to a top of the capping magnetic layer.

35. A method of manufacturing a recording medium, comprising:
forming a composite hard magnetic recording layer consisting of a plurality of columnar grains having a crystallographic texture by providing a hard magnetic layer and growing a capping magnetic layer on the hard magnetic layer such that a given columnar grain of the plurality of columnar grains includes a first portion within the hard magnetic layer and a second portion within the capping magnetic layer,
wherein the composite hard magnetic recording layer has an $L1_0$ crystal structure and the crystallographic texture comprises a (001) texture, and
wherein the hard magnetic layer comprises a FePt—C alloy.

36. The method of claim 35, wherein the capping magnetic layer has a first coercivity that is less than or equal to a second coercivity of the hard magnetic layer.

37. The method of claim 35, wherein the capping magnetic layer comprises a CoPt—$SiO_2$ alloy, a CoPt—$TiO_2$ alloy, a FePt—$SiO_2$ alloy, or a FePt—$TiO_2$ alloy.

38. The method of claim 37, wherein:
if present, the composition of the CoPt—$SiO_2$ alloy is $(Co_XPt_{(1-X)})_{(1-Y)}$—$(SiO_2)_{(Y)}$;
if present, the composition of the CoPt—$TiO_2$ alloy is $(Co_XPt_{(1-X)})_{(1-Y)}$—$(TiO_2)_{(Y)}$;
if present, the composition of the FePt—$SiO_2$ alloy is $(Fe_XPt_{(1-X)})_{(1-Y)}$—$(SiO_2)_{(Y)}$; and
if present, the composition of the FePt—$TiO_2$ alloy is $(Fe_XPt_{(1-X)})_{(1-Y)}$—$(TiO_2)_{(Y)}$;
where X is between 40 at. % and 80 at. % and Y is between 5 at. % and 15 at. %.

39. The method of claim 38, where X is between 40 at. % and 60 at. %.

40. The method of claim 38, where X is between 60 at. % and 80 at. %.

41. The method of claim 35, wherein the capping magnetic layer has a thickness between about 1 nm and 10 nm.

42. The method of claim 35, wherein the composite hard magnetic recording layer has a thickness less than about 15 nm.

43. The method of claim 35, wherein the composite hard magnetic recording layer has a coercivity below about 10 kOe.

44. The method of claim 35, wherein the hard magnetic layer has a coercivity greater than about 12 kOe.

45. The method of claim 35, wherein the capping magnetic layer has a coercivity from about 1 kOe to about a coercivity of the hard magnetic layer.

46. The method of claim 35, further comprising forming an orientation layer configured to orient a formation of the $L1_0$ crystal structure and the (001) texture, wherein the orientation layer comprises MgO, and wherein the composite hard magnetic recording layer is over the orientation layer.

47. The method of claim 46, wherein the capping magnetic layer comprises a CoPt—$SiO_2$ alloy, a CoPt—$TiO_2$ alloy, a FePt—$SiO_2$ alloy, or a FePt—$TiO_2$ alloy.

48. The method of claim 47, wherein the capping magnetic layer has a first coercivity that is less than or equal to a second coercivity of the hard magnetic layer.

49. The method of claim 35:
wherein a width of the given columnar grain is substantially the same throughout a height thereof; and
wherein the height of the given columnar grain extends from a bottom of the hard magnetic layer to a top of the capping magnetic layer.

* * * * *